United States Patent
Bigelow

(10) Patent No.: US 10,105,869 B2
(45) Date of Patent: Oct. 23, 2018

(54) METHOD OF MANUFACTURING A CEMENT-MIXED CONCRETE TILE

(71) Applicant: Peter Bigelow, Moose Lake, MN (US)

(72) Inventor: Peter Bigelow, Moose Lake, MN (US)

( * ) Notice: Subject to any disclaimer, the term of this patent is extended or adjusted under 35 U.S.C. 154(b) by 338 days.

(21) Appl. No.: 14/937,244

(22) Filed: Nov. 10, 2015

(65) Prior Publication Data

US 2016/0129608 A1    May 12, 2016

Related U.S. Application Data

(60) Provisional application No. 62/078,233, filed on Nov. 11, 2014.

(51) Int. Cl.

| | | |
|---|---|---|
| *B28B 23/00* | (2006.01) | |
| *B28B 1/087* | (2006.01) | |
| *B28B 1/52* | (2006.01) | |
| *C04B 28/02* | (2006.01) | |
| *B28B 7/34* | (2006.01) | |
| *C04B 111/00* | (2006.01) | |

(52) U.S. Cl.
CPC .............. *B28B 1/0873* (2013.01); *B28B 1/52* (2013.01); *B28B 23/0006* (2013.01); *C04B 28/02* (2013.01); *B28B 7/348* (2013.01); *C04B 2111/00612* (2013.01)

(58) Field of Classification Search
CPC ...... B28B 1/0873; B28B 23/0006; B28B 1/52
See application file for complete search history.

(56) References Cited

U.S. PATENT DOCUMENTS

| | | | | |
|---|---|---|---|---|
| 3,789,102 | A * | 1/1974 | Hazelett, Jr. | B28B 5/04 264/295 |
| 3,845,593 | A | 11/1974 | Zen | |
| 6,101,776 | A * | 8/2000 | Conley | E04F 15/14 219/213 |
| 7,784,419 | B2 | 8/2010 | Bigler et al. | |
| 8,984,832 | B2 | 3/2015 | Busby | |
| 2004/0126602 | A1* | 7/2004 | Wallner | C04B 28/02 428/500 |

(Continued)

OTHER PUBLICATIONS

Department of Materials Science and Engineering from the University of Illinois Urbana-Champaign, "The Basic Mix", Aug. 6, 2010, University of Illinois Urbana-Champaign (found online at http://matse1.matse.illinois.edu/concrete/bm.html). (Year: 2010).*

*Primary Examiner* — Matthew J Daniels
*Assistant Examiner* — Kelsey C Grace

(57) ABSTRACT

A method of manufacturing the cement-mixed concrete tile includes the following steps: a portion of cement is mixed with sand at a ratio within a range of 1:4 to 3:4, then a predetermined number of cups of water is added to the mixture formed by the cement and the sand. A water reducing agent which increases flowability is added to the above mixture to form a first mixture. A mold is positioned on a vibration table, where a weaved fiberglass mesh is positioned on top of the mold. The first mixture is loaded into the mold and the vibration table is vibrated, and then cement mix is mixed into the mold separately to fill from above the weaved fiberglass mesh towards the top of the mold through the first mixture, and where the mold is placed in retention for a predetermined time to generate the cement-mixed concrete tile.

11 Claims, 4 Drawing Sheets

(56) References Cited

U.S. PATENT DOCUMENTS

| | | |
|---|---|---|
| 2007/0187873 A1 | 8/2007 | Bailey |
| 2009/0050401 A1* | 2/2009 | Sanders ................ E01F 8/0082 |
| | | 181/141 |
| 2012/0148806 A1* | 6/2012 | Dubey ................ B28B 19/0092 |
| | | 428/193 |
| 2013/0089692 A1 | 4/2013 | Grasso |

* cited by examiner

METHOD OF MANUFACTURING A CEMENT-MIXED CONCRETE TILE

CROSS REFERENCE TO RELATED APPLICATIONS

This application claims the benefit of U.S. Provisional application No. 62/078,233 filed on Nov. 10, 2014.

BACKGROUND

Construction of floor using tiles has always been a popular method in the field of architecture. Conventionally, tiles of thickness, for example, 1 inch to 2 inches, are manufactured in order to meet the customer needs in various conditions. However, conventional tiling methods encounter some problems, such as, where the conventional tiles lack a considerable amount of lateral as well as compressive strength which might cause failure of the tiles during cyclic or impact loads. The general span provided above joists for such conventional tiles is, for example, about 16 inches. Currently, there are also other products in the market that are made of plastic and are designed to span across 16 inch joists to form a sub-base to allow regular un-reinforced pavers or stone to be applied above them which comprises a two-step process, first applying the plastic web substrate, and then laying the pavers or stone on the top of the webbing. This system further requires a much heavier structural framing than standard framing which makes it more costly and time consuming.

Further, there are other tile products or similar structural elements that are 2 inches or more in thickness which are heavy and requires a heavy duty structure to support it, which is therefore not cost effective. Most of these tile products also face the problem of alignment where tiles of a higher value of thickness, such as 2 inch thickness cannot be aligned over standard wood-framed decks which are primarily meant to support tiles of 1 inch thickness. Further, the conventional 1 inch cement tiles cannot span from joist to joist without cracking or breaking due to its low strength characteristics, and other such concrete pavers or tile are not designed to free span across joists since they are made for just for ground applications. Therefore there is a need for a tile of substantial lateral strength and flexural strength, which can be applied to the joists without any application of a structural substrate, and which can withstand the stress of heavy weight and shock.

Hence, there is a long felt but unresolved need for a cement-mixed concrete tile which can overcome the above mentioned disadvantages. The cement-mixed concrete tile satisfies the need for high lateral strength, cost effective installation, ability to be applied over most standard wood-framed decks with only minor alterations to the framing, and allows the tile to be installed in a single step without a structural substrate thereby saving time and money.

SUMMARY OF THE INVENTION

The composition of the cement-mixed concrete tile comprises cement, sand, water, a water reducing agent, cement mix which comprise chopped fiberglass elements, and a weaved fiberglass mesh. The method of manufacturing the cement-mixed concrete tile, comprises the following steps: A portion of cement is mixed with sand at a ratio within a range of 1:4 to 3:4. Predetermined number of cups of water is added to the mixture formed by the cement and the sand, and chopped fiberglass elements are mixed into the cement mix to form a first mixture. A mold is positioned on a vibration table, and the first mixture is loaded into the mold till the mold is half full, and then the mold is vibrated on the vibration table until the air bubbles are removed from the upper surface of the mold. Then the mold is moved to a flat surface. The cement mix is added to the mold, where the cement mix is configured to fill the mold at a predetermined depth, for example, about ⅛ inches from top, leaving a predetermined space to trowel in the weaved fiberglass mesh on the top of mold, followed by adding cement mix on top of weaved fiberglass mesh and screed level with top of mold. The mold placed in retention for a predetermined time to generate the cement-mixed concrete tile.

In an embodiment, the ratio of mixing a portion of cement with the sand is, for example, about 1:2. In an embodiment, 2 cups of water is added to the mixture formed by the cement and the sand. In an embodiment, the woven fiberglass mesh is positioned on top of the mold to maximize lateral strength. In an embodiment, the mold is made of polyurethane rubber. In an embodiment, the first mixture fills about a third of forth of the volume of the mold prior to the addition of the cement mix into the mold. In an embodiment, the cement-mixed concrete tile is configured to be positioned on joists with a span of 16 inches. In an embodiment, the cement-mixed concrete tile is fixedly attached on the on the joists with a fastening element, for example, a polyurethane adhesive.

DETAILED DESCRIPTION OF THE INVENTION

Figure 1:
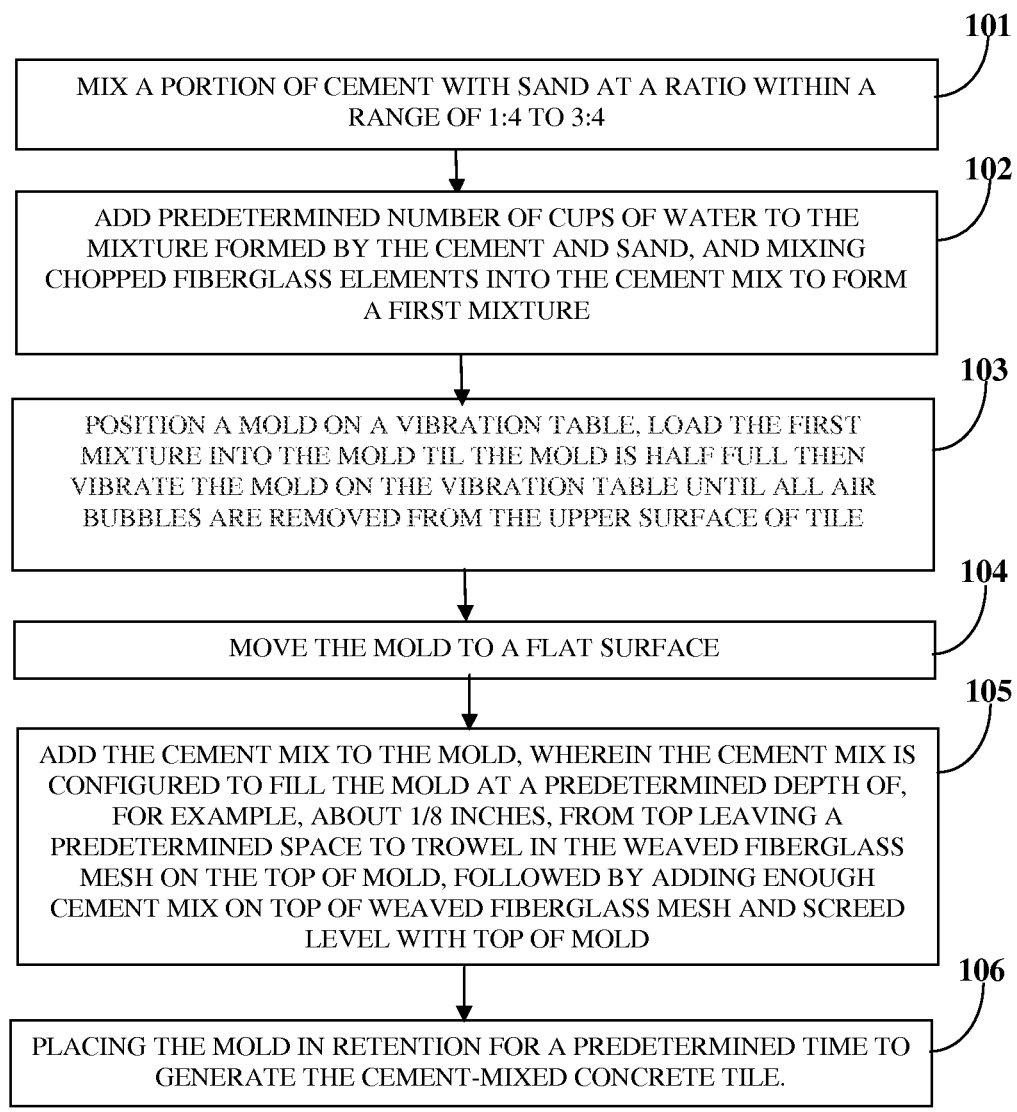
FIG. 1 exemplarily illustrates a method of manufacturing a cement-mixed concrete tile.
Figure 2:
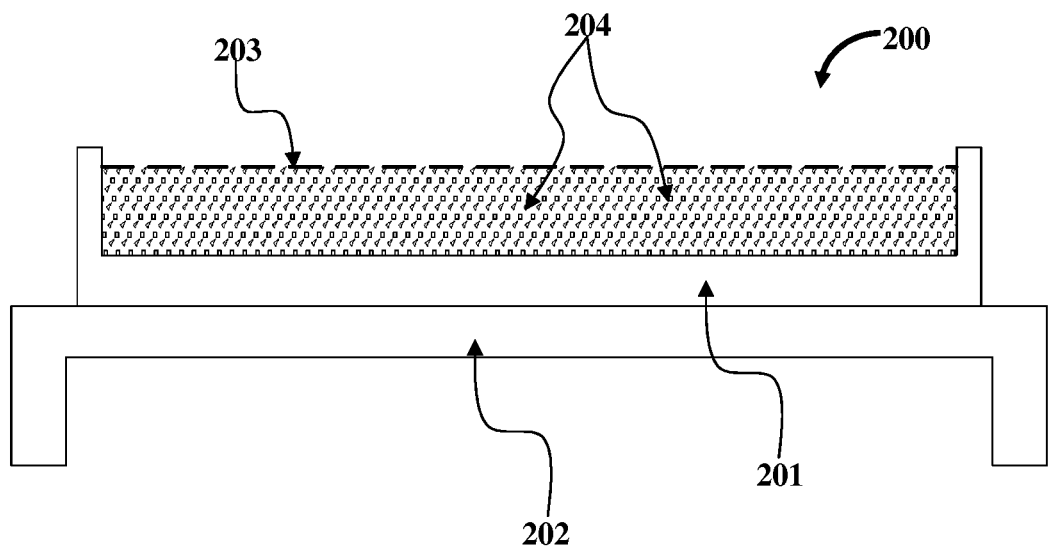
FIG. 2 exemplarily illustrates a front sectional view of the cement-mixed concrete tile being positioned in a mold during the manufacturing process.

FIG. 1 exemplarily illustrates a method of manufacturing a cement-mixed concrete tile 200, and FIG. 2 exemplarily illustrates a front sectional view of the cement-mixed concrete tile 200 positioned in a mold 201 during the manufacturing process. The composition of the cement-mixed concrete tile 200 comprises cement, sand, water, a water reducing agent, cement mix 204 which comprise chopped fiberglass elements, and a weaved fiberglass mesh 203. The method of manufacturing the cement-mixed concrete tile 200, comprises the following steps: A portion of cement is mixed 101 with sand at a ratio within a range of 1:4 to 3:4. Predetermined number of cups of water is added 102 to the mixture formed by the cement and the sand, and chopped fiberglass elements 204 are mixed into the cement mix to form a first mixture. A mold 201 is positioned 103 on a vibration table 202, and the first mixture is loaded into the mold 201 till the mold 201 is half full, and then vibrate the mold 201 on the vibration table 202 until the air bubbles are removed from the upper surface of the mold 202, or upper surface of the preformed tile. Then the mold 201 is moved 104 to a flat surface. The cement mix is added 105 to the mold 201, where the cement mix is configured to fill the mold 201 at a predetermined depth, for example, about ⅛ inches from top, leaving a predetermined space to trowel in the weaved fiberglass mesh 203 on the top of mold 201, followed by adding cement mix on top of weaved fiberglass mesh 203 and screed level with top of mold 201. The mold 201 is placed 106 in retention for a predetermined time to generate the cement-mixed concrete tile 200.

In an embodiment, a water reducing agent is added to the mixture of the cement, the sand, and the water, where the water reducing agent is configured to increase flowability of the mixture. As disclosed herein, a 'water reducing agent' refers to a material which either increases workability of freshly mixed mortar or concrete without increasing its water content or maintains workability with a reduced amount of water. In an embodiment, the ratio of mixing a portion of cement with the sand is, for example, about 1:2 of the Portland cement with sand. In an embodiment, 2 cups of water is added to the mixture formed by the cement and the sand. In an embodiment, the woven fiberglass mesh 203 is positioned on top of the mold 201 to maximize lateral strength. In an embodiment, the mold 201 is made of polyurethane rubber. In an embodiment, the first mixture fills about a third of forth of the volume of the mold 201 prior to the addition of the cement mix 204 into the mold 201.

Figure 3A:
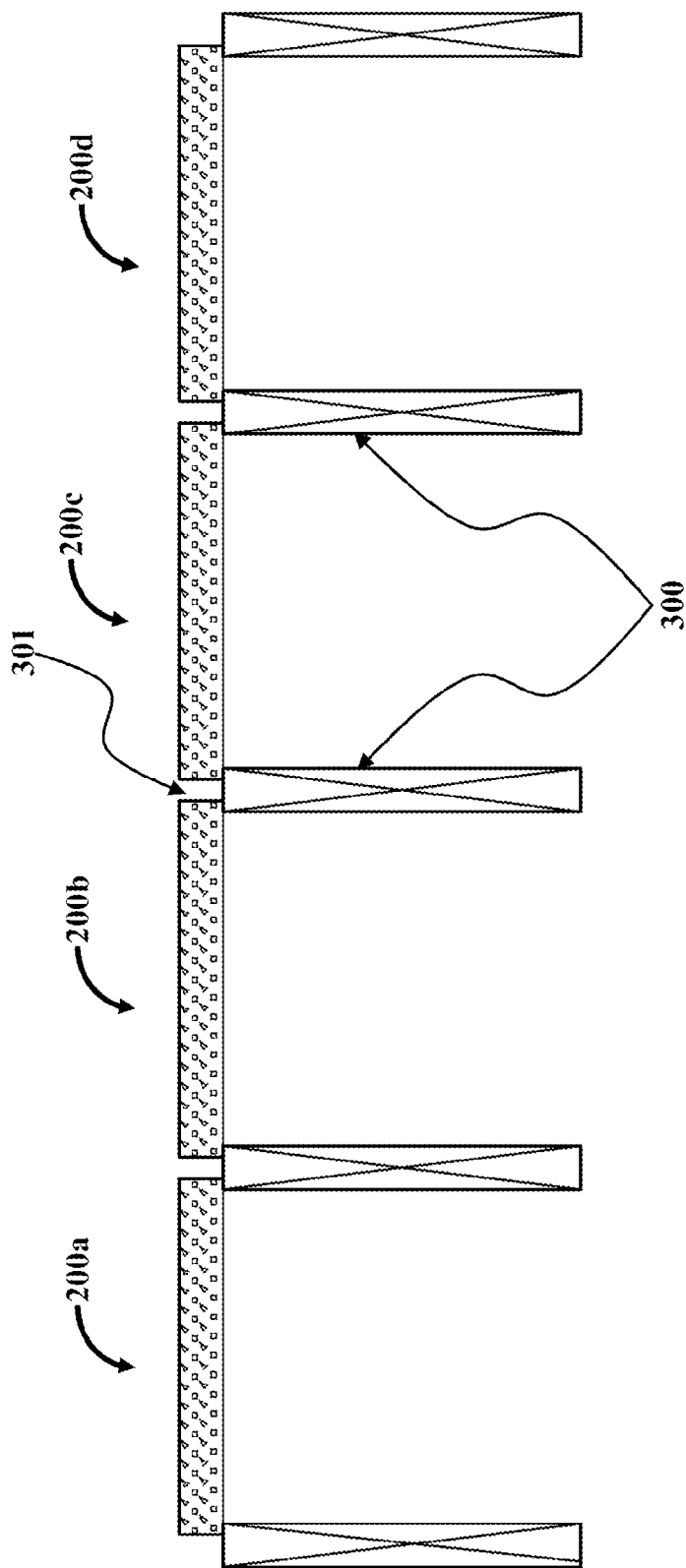
FIG. 3A exemplarily illustrates a side elevation view of the positioning of the cement-mixed concrete tiles over joists.
Figure 3B:
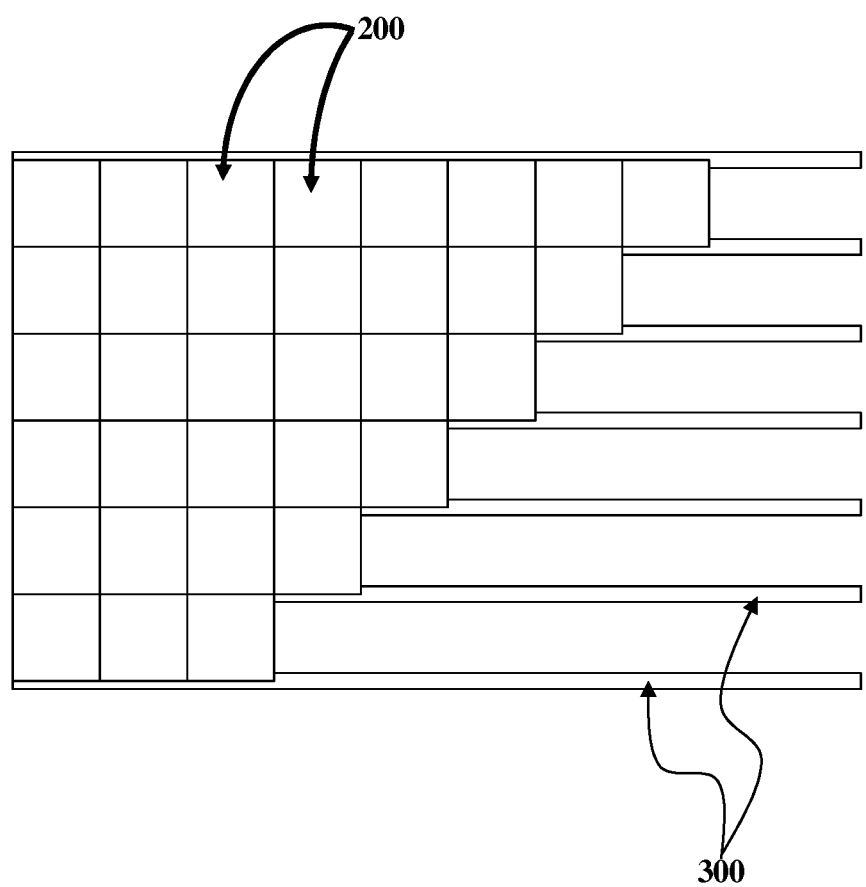
FIG. 3B exemplarily illustrates a top plan view of the positioning of the cement-mixed concrete tiles over joists.

FIG. 3A exemplarily illustrates a side elevation view of the positioning of the cement-mixed concrete tiles 200a, 200b, 200c and 200d over joists 300, and FIG. 3B exemplarily illustrates a top plan view of the positioning of the cement-mixed concrete tiles 200a, 200b, 200c and 200d over joists 300. The joists 300 are, for example, elevated wooden members. In an embodiment, the cement-mixed concrete tiles 200a, 200b, 200c and 200d are configured to be positioned on joists 300 with a span of, for example, 16 inches. In an embodiment, the cement-mixed concrete tiles 200a, 200b, 200c and 200d are fixedly attached on the on the joists 300 with a fastening element, for example, a polyurethane adhesive, as shown in FIG. 3A. The water drainage gaps 301 between the cement-mixed concrete tiles 200a, 200b, 200c and 200d are defined by the positioning of the cement-mixed concrete tiles 200a, 200b, 200c and 200d in series. In an example, the combination of reinforcement and admixes enable the cement-mixed concrete tiles 200a, 200b, 200c and 200d to span across the 16 inch joists 300 and further the cement-mixed concrete tiles 200a, 200b, 200c and 200d are manufactured to withstand more than, for example, 1200 pounds (lbs). Referring to FIG. 2, the cement-mixed concrete tile 200 is able to withstand weather better than wood or any other composites during normal use. In the conventional system, there are no existing 1 inch cement tiles that can span across 16 inch exterior joists 300 without cracking or breaking, therefore the cement-mixed concrete tile 200 is an improvement on what currently exists. In an example, the additives added in the molding of the cement-mixed concrete tile 200 are, for example, acrylic, air entrainment materials, and plasticizers.

In an embodiment, the addition of the fiberglass mesh 203 in sheet form to the relatively thin cement-mixed concrete tile 200, gives the high compressive qualities to the cement-mixed concrete tile 200 and provides high tensile strength which enables the cement-mixed concrete tile 200 to span across the 16 inch joists 300, thereby acquiring the ability to bear heavy loads. The high-strength fiberglass mesh 203 is the primary constituent that provides strength for the cement-mixed concrete tile 200 which is manufactured with only 1 inch thickness, where the conventional systems use steel reinforcement in their 2 inch thick concrete decking material.

The type and gauge of the fiberglass mesh 203 is also important for the integrity of the cement-mixed concrete tile 200 to be able to span across 16 inch joists 300 without using other typical reinforcements, for example, steel, iron or sheet goods. Therefore, the fiberglass mesh 203 is the important in enhancing the quality of the ultrathin 1 inch cement-mixed concrete tile 200. The cement and sand are also necessary as the matrix for the cement-mixed concrete tile 200, but ratios could possibly be altered to change PSI ratings. Admixes such as liquid acrylic, or silica fume could be added to raise PSI levels of the concrete. The size or design can be altered to change appearance of the cement-mixed concrete tile 200. The structural components ratio of the cement-mixed concrete tile 200 could be altered to get higher or lower concrete PSI rating. The fiberglass mesh 203 could be changed in weight per ounce (oz) to achieve greater or lesser load bearing limits.

The cement-mixed concrete tile 200 is, for example, a 1 inch concrete tile paver that is structurally capable of elevated deck applications. The 1 inch size of the cement-mixed concrete tile 200 enables it to be lightweight so that typical wood framed decks can use the cement-mixed concrete tile 200 for an elevated deck, allows it to be universally compatible with existing wood framed decks as they are framed for standard 1 inch wood or composite decking, and can be used in conjunction with standard products or frames available in the market, since in conventional systems, other 2 inch or thicker concrete products are too thick and heavy for standard wood framed decks. Cement concrete also has a much higher weather resistance than other wood and composite decking materials so cement is preferred in the molding of the cement-mixed concrete tile 200. The cement-mixed concrete tile 200 is of the same thickness as other standard decking materials which allows the end-user to use the cement-mixed concrete tile 200 to retrofit it on the available standard deck to avoid any height issues proximal to doors or openings. In other words a user uses a 2 inch thick conventional tile, it could be too high and could interfere with the door sill. The cement-mixed concrete tile 200 can be used in conjunction with other decking materials for aesthetic value and for edge trims.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

I claim:

1. A method for manufacturing a reinforced cement-mixed concrete tile, the tile having a thickness of between 1 inch and 2 inches, the method comprising:
   (i) mixing a portion of cement with a portion of sand at a ratio between 1:4 and 3:4;
   (ii) mixing water into the cement and the sand;
   (iii) adding fiberglass elements into the cement mix to form a first mixture;

(iv) providing a mold and loading the first mixture into the mold until the mold is partially full;

(v) removing air bubbles from the first mixture in the mold;

(vi) adding an additional volume of a second mixture consisting of cement, sand and water to the mold, such that the mold is filled to a predetermined depth from top, leaving a predetermined space at the top surface of the mold;

(vii) placing a weaved fiberglass mesh onto the exposed top surface of the mixture in the mold.

2. The method of claim 1 additionally including the steps of:

(viii) further, applying a thin layer of concrete mix onto the fiberglass mesh level with top of mold, (iv) leaving the mold until it sets to generate a reinforced cement-mixed concrete tile having a thickness of between 1 inch and 2 inches.

3. The method of claim 1 wherein air bubbles are removed from the first mixture by using a vibration plate to vibrate the mixture.

4. The method of claim 1, wherein the cement and sand are mixed at a ratio of about 1:2.

5. The method of claim 1, further comprising adding a water reducing agent to the mixture of the cement, the sand, and the water, wherein the water reducing agent increases flowability of the mixture.

6. The method of claim 1, wherein the woven fiberglass mesh is positioned on top of the mold to maximize lateral strength.

7. The method of claim 1, wherein the mold is made of polyurethane.

8. The method of claim 1, wherein the first mixture fills between a third and a fourth of the volume of the mold prior to adding an additional volume of a mixture of cement, sand and water to the mold.

9. The method of claim 1, wherein the cement-mixed concrete tile is configured to be positioned on joists with a span of 16 inches.

10. The method of claim 1, wherein the reinforced cement-mixed concrete tile produced thereby is about 1 inch in thickness.

11. The method of claim 1, wherein the reinforced cement-mixed concrete tile produced thereby is about 2 inch in thickness.

* * * * *